United States Patent [19]

Ishii et al.

[11] 3,946,407

[45] Mar. 23, 1976

[54] MANUALLY OPERATED PHOTOCOMPOSING APPARATUS

[75] Inventors: Kiyoshi Ishii; Shigeru Fuse; Masatake Takashima, all of Tokyo, Japan

[73] Assignee: Shaken Co., Ltd., Tokyo, Japan

[22] Filed: Sept. 3, 1974

[21] Appl. No.: 502,534

[30] Foreign Application Priority Data

Sept. 5, 1973 Japan .............................. 48-99822

[52] U.S. Cl. ................................ 354/6; 340/324 A
[51] Int. Cl.$^2$ ........................................ G03B 19/00
[58] Field of Search ....... 354/6; 340/324 A, 324 AD

[56] References Cited

UNITED STATES PATENTS

| | | | |
|---|---|---|---|
| 3,553,676 | 1/1971 | Raciti | 354/6 |
| 3,740,743 | 6/1973 | Baron | 354/6 |
| 3,816,823 | 6/1974 | Manber | 354/6 |

*Primary Examiner*—R. L. Moses
*Attorney, Agent, or Firm*—Oblon, Fisher, Spivak, McClelland & Maier

[57] ABSTRACT

A photocomposing apparatus is disclosed which makes use of a camera means, memory means and display means, which can select character from a character matrix and store all of the characters thus selected as an image signal in the memory means, which can determine the amount of feed of each character after characters to be composed on a line having a given length or in a block have been selected, and which can display the character on the display means and its photograph can be taken on a photosensitive medium, thereby effecting printing of the characters.

5 Claims, 6 Drawing Figures

MANUALLY OPERATED PHOTOCOMPOSING APPARATUS

BACKGROUND OF THE INVENTION

This invention relates to photocomposing apparatuses and more particularly to a manually operating photocomposing apparatus which can store as an image signal all of characters which have been selected from a character matrix, which can determine the amount of feed of each character and subsequently reproduce a character image on a display means, and which can print the displayed character image on a photosensitive medium.

Contrary to a composing apparatus, a conventional photocomposing apparatus has the disadvantage that it is extremely difficult to displace those characters which have been printed on a photosensitive medium for the purpopse of correcting the characters or adjusting a character space. As a result, in the case of using the connventional manually operating photocomposing apparatus so as to effect a special composition in which the amount of feed of the characters could not easily be determined such, for example, as solid composition to be effected within a line having a given length, European character form, form of chemical symbols and the like, it has been the common practice to require prior to composing a very troublesome pretreatment such as distribution of characters or so-called allotment calculation, calculation of the amount of feed of characters and the like.

In the case of effecting a sort of special so-called solid photocomposition of those characters which are sufficiently spaced apart from each other such, for example, as "W" and "A" as well as A and "T" as shown in FIG. 1*a* and Japanese Kana (character) "う" (shi) and "し" (U) as shown in FIG. 2*a*, the character space is reduced and a portion of each character is protruded into the adjacent character region as shown in FIG. 1*b* and FIG. 2*b*, respectively. Such solid photocomposition has required a careful pretreatment. In addition, print in practice has required troublesome operations such as change of the amount of feed and the like and considerably long time, and as a result, a great burden had been imposed on an operator of the conventional photocomposing apparatus.

That is, in the customary composition of Japanese characters, the amount of feed of the characters is uniformly determined if the size of characters is determined. In the solid composition, however, the presence of a character space renders it possible to reduce the amount of feed of these characters, while the absence of such space makes the reduction impossible. In addition, the amount which is capable of reducing the amount of feed could not clearly be determined unless the adjacent characters are aligned with each other. As a result, heretofore it has been the common practice to print the characters to be solidly printed on films and the like and superimpose these films one upon the other so as to calculate that amount of feed which can be reduced or to provide a photocomposing apparatus which can form an image of the characters to be printed on a finder and the like. In such photocomposing apparatus, the image formed on the finder is transferred onto a sheet of paper and the like and then the image of character to be printed is formed adjacent to the preceeding image, whereby the amount of feed which can be reduced is calculated.

These methods have the disadvantage that it is difficult to precisely calculate the amount of feed which can be reduced, that the above described calculation must be effected for each character, that a plenty of time is required, and that a great burden is imposed on an operator of the photocomposing apparatus.

As above described, Japanese characters "し" (shi) and "う" (u) shown in FIG. 2*a* can be solidly composed as those shown in FIG. 2*b*. In order to obtain the composed as shown in FIG. 2*b*, the characters "し" (shi) and "う" (u) are divided into A to J portions in X direction and *a* to *j* portions in Y direction. Spaces between those portions which can be overlapped with each other are reduced so as to suuperimpose J*f* portion of the character"し"(shi) upon G*f* portion of the character"う"(u). As seen from FIG. 2*c*, if the character space is reduced by 7 portions or steps, then the picture image of one of the characters overlaps the other character, so that it is preferable to reduce the space between the two characters by 6 portions or steps as shown in FIG. 2*b*. As a result, if the number of divided units *a* to *j* and A to J are made equal to the number of feed units of the photocomposing apparatus, a desired solid composition can be effected.

If the prohibition mark "(" is present at the end of line 1 as shown in FIG. 3*a*, this prohibition mark is made located at the beginning of line 2 as shown in FIG. 3*b*, and as a result, the number of characters on line 1 shown in FIG. 3*a* is reduced. Thus, it is necessary to suitably increase the character space so as to make its line length equal to the line length of line 2 as shown in FIG. 3*b*. Such treatment is called as a line end prohibition treatment. Similarly, if the prohibition mark is present at the beginning of line, so-called line beginning prohibition treatment can be effected. Thus, the operator of the photocomposing apparatus must always pay his attention to the position of the prohibition mark. If the prohibition mark is located at a position from which the prohibition mark must be removed by the prohibition treatment or the prohibition mark located at the end of a line is transferred to the beginning of the next line, the remainder of characters on the preceeding line must increase a spacing therebetween and the amount of feed of one character must be distributed over several characters by calculation.

In Japan, about 5,000 characters are used so that it is substantially impossible to take all of the above combinations of these characters into consideration. As a result, these combinations must manually be effected by an operator. Such manual operation becomes very troublesome if a case at which a line length is given or another case at which the line length is not given are taken into consideration.

Similarly, in the case of composing European characters whose widths are different from each other on a given length of line, whether or not the characters can be aligned on the given line could not be discriminated unless the print has been completed. As a result, a trial print is previously effected so as to ascertain the presence of the remainder of the line length and then a calculation is effected so as to allocate the remainder of the line length over word spaces, and finally a real print must be effected. Such steps in succession imposed a great burden on an operator of the conventional photocomposing apparatus and provided the disadvantage that a composition efficiency becomes lowered and that the composition becomes erroneous.

Even in the photocomposing apparatus which does not require the above described trial printing, a careful pretreatment of effecting an allotment calculation has been required prior to the real printing in the above described special form such as a prohibition treatment, setting calculation, flush right and left, flush centered, chemical constructional formula form, music note and the like. In addition, such operation of changing the amount of feed must be effected at every printing. The prohibition treatment shall be understood to mean a treatment in which special marks which are called as prohibition marks such as period "." and "°" or parenthesis mark "(" should not be located at the beginning of line or at the end of line. In addition, in the case of real printing, the amount of feed must be changed in response to the prohibition treatment. Such treatments must also be effected in the case of special forms such as form calculation, flush right and left, flush centered, chemical constructional formula form, music note and the like. Thus, a careful allotment calculation must be effected prior to the real printing. In addition, the amount of feed must be changed every time the printing is effected. As a result, similar to the above described solid composition and composition of the European characters, a great burden is imposed on an operator of the photocomposing apparatus and an composition efficiency becomes lowered and the composition becomes erroneous.

OBJECT OF THE INVENTION

An object of the invention is to provide a photocomposing apparatus which can obviate troublesome pretreatments and operations such as character allocation, calculation on the amount of feed of characters, trial printing, change of the amount of feed of characters and the like which have been encountered with special composition at which the amount of feed of characters could not uniformly be determined for each character width such, for example, as a solid composition within a given length of line, European composition, setting composition, flush right and left, flush centered, music note, and which can relieve the burden imposed on an operator.

Another object of the invention is to provide a photocomposing apparatus further comprising a monitor display means and which is capable of correcting character image by effecting addition and removal of any desired character.

SUMMARY OF THE INVENTION

This invention is intended to obviate troublesome operations which have been encountered with a conventional manually operating photocomposing apparatus owing to the above described various reasons in principle of photocomposition and relates to a manually operating photocomposing apparatus which can store as an image signal all of characters which have been selected from a character matrix, which can determine the amount of feed of each character and subsequently reproduce a character image on a display means, which can use a camera means, memory means and display means to select a character and store the character signal thus selected as an image signal in the memory means, which can determine the amount of feed of each character after the character to be printed on a line having a given length or in a block has been selected, and which can display the character on the display means and take its photograph on a photosensitive medium, thereby effecting printing.

BRIEF DESCRIPTION OF THE DRAWINGS

In FIG. 4 is shown the essentials of an example of a manual photocomposing apparatus heretofore proposed. Light from a light source 1 illuminates through a lens system 2, mirror 3 and lens 4 upon a character matrix 5. Images of characters and mark at the exposure position of the character matrix 5 are incident through a masking-device 6 for permitting light of only one exposure character to reach a lens cylinder upon a lens in a lens cylinder 8 mounted on a turret 7. The lens in the lens cylinder 8 serves to change the magnification of the images of characters and marks. These images of characters and marks pass through a shutter S and a photograph thereof is taken on a photosensitive medium 11 disposed on a drum 10 in a magazine 9. The lens turret 7 is rotatable about an axis 12 and provided at its periphery with a desired number of lens cylinder 8. As a result, a rotation of the turret 7 ensures change in magnification of the characters and marks in the character matrix 5 and print of these characters and marks on the photosensitive medium 11. The character matrix 5 is mounted on a frame 13 adapted to be moved in directions shown by arrows 17, 19 in a manner such that the characters at any position on the character matrix 5 can be positioned under the masking device 6. In the present example, the character matrix 5 is composed of three small character matrices and one large character matrix, each of these character matrices being mounted on the movable frame 13. The frame 13 is provided at its end and side edges with racks 14 which engage with position defining members 15, respectively. In the case of composing characters, the movable frame 13 is moved by an operator's hand to bring a desired character into composing alignment with the masking device 6 and then the position defining member 15 is operated to cause it to be engaged with the rack 14, thereby making the movable frame 13 stationary. Subsequently, the shutter S is released to project the light beam passed through the desired character upon the photosensitive medium 11, whereby photograph of the desired character can be taken on the photosensitive medium 11. After the photograph of the desired character has been taken, a given feed operation and release of the position defining member 15 are effected to be ready for the next character printing.

In FIG. 5 is schematically shown an embodiment of a manually operating photocomposing apparatus according to the invention. Reference numeral 40 designates a light source, 41 a condenser lens, 42 a shutter, 43 a character matrix, 44 a lens, 45 a television camera means such as vidicon, image orthicon and the like, 46 a memory means for storing a scanning signal corresponding to selected character such as a video tape recorder, disc accumulator tube, semiconductor memory and the like, 47 a display tube composed of a cathode ray tube and the like, 48 a lens, 49 a photosensitive medium, 50 a feed circuit inclusive of a pulse motor and the like for shifting the photosensitive medium or a travelling lens system (not shown) everytime the photosensitive medium 49 is printed by the selected character and after printing over one line has been completed, 51 a group of instruction buttons (FIG. 6) for delivering instructions for printing operation and for various kinds of typesetting inclusive of type closing, prohibition treatment and the like, and 52 a control circuit for calculating the amount of feed of a group of characters stored in the memory means 46 and controlling circuits of the shutter 42, display tube 47 and feed circuit 50. In FIG. 5, the shutter 42 is disposed between the condenser lens 41 and the character matrix 43. Alternatively, the shutter 42 may be disposed between the character matrix 43 and the lens 44 or between the lens 44 and the camera means 45. In addition, as the light source 40 use may be made of a flash lamp instead of a customary electric bulb shown in FIG. 5. In the case of using the flash lamp, the shutter 42 may be dispensed with. In addition, in order to omit the lens 48 for projecting the character image on the display means 7 onto the photosensitive medium 49, the display means per se may be composed of, for example, an optical fiber transfer tube which can directly project the character image onto the photosensitive medium 49.

Figure 1:
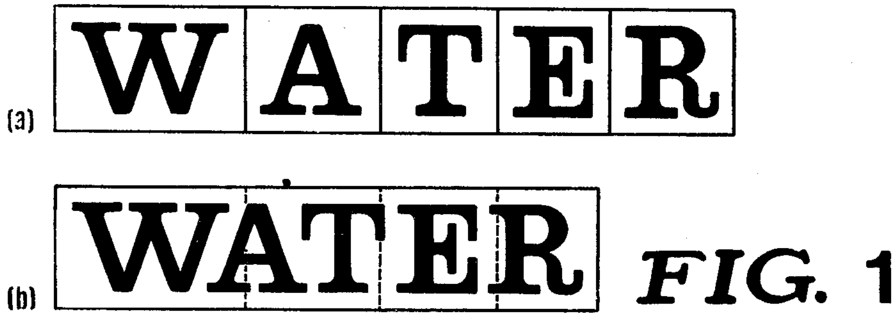
FIG. 1*a* shows customary European characters.
FIG. 1*b* shows similarly the characters shown in FIG. 1*a* and solidly composed.

If the operator causes the character matrix 43 to be moved to and fro and to left and right so as to register a desired character into exposure position and then a print button 51*a* of the instruction button group 51 (FIG. 6) is pushed, a signal is delivered from the control circuit 52 to the shutter 42. The shutter 42 is thus opened and closed to project the image of the character on the character matrix 43 through the lens 44 onto the target surface of the camera means 45. At the same time, a signal is delivered from the control circuit 52 to the memory means 46 to store scanning signal of the character projected onto the camera means 45. All of the characters included in one line are thus projected onto the camera means 45 in succession. If the scanning signal of the character projected onto the camera means 45 is stored in the memory means 46, a print button 51*b* in the instruction button group 51 is pushed to deliver a signal to the control circuit 52. The control circuit 52 becomes operated to calculate the amount of a group of characters stored in the memory means 46 and delivers a character scanning signal thus calculated to the display means 47, whereby the character image is displayed on the display means 47 and the character image thus displayed is projected through the lens 48 onto the photosensitive medium 49.

If the character image is projected onto the photosensitive medium 49, the signal whose amount of feed is calculated in the control circuit 52 is delivered to the feed circuit 50 to shift the photosensitive medium 49 or the travelling lens system (not shown) over a given distance. The above described operations are repeated to print the characters corresponding to one line and then a new line is begun and its beginning is brought into printing alignment with the beginning of the preceeding line.

On the display means 47 may be displayed only one character or a plurality of characters at the same time. In the case of simultaneously displaying a plurality of characters on the display means 47, the amount of feed calculated by the control circuit 52 is supplied to a deflecting circuit of the display means 47 so as to adjust spacings between the adjacent characters and the feed circuit 50 is operated such that the corresponding amount of feed is delivered to the photosensitive medium 49.

The invention will now be described in greater detail with reference to FIG. 6.

In the case of starting the composing operation, the operator pushes those buttons of the instruction button group 51 which correspond to, for example, character size, presence or absence of modification in shape and its degree, amount of feed, line length, and longitudinal or transverse composition so as to give instructions correspondingly. Then, the character matrix 43 is moved to and fro and left and right to find out a desired character and to locate it at a exposure position. If the character selection button 51*a* is pushed, the control circuit 52 becomes operated to deliver a signal to the shutter 42 so as to make it open and close, and as a result, the desired character on the character matrix 43 is projected through the lens 44 onto the target surface of the camera means 45. Then, the control circuit 52 becomes operated to deliver a signal to the memory means 46 to cause it to store the scanning signal corresponding to the character projected onto the camera means 45 in an image recording device 46*a* in the memory means 46. At the same time, the number of operations of the shutter 42 is stored in a shutter number counter circuit 46*b* and stored also in a character and space counter circuit 46*c*. In the similar manner, all of the characters of one line are projected onto the camera means 45 in succession. If the scanning signals corresponding thereto are stored in the image recording device 46*a*, the number of operations of shutter 42 is stored in the shutter number counter circuit 46*b*, and the sum of the characters and character spaces therebetween is stored in the character and space counter circuit 46*c*. Then, a print button 51*b* in the instruction button group 51 is pushed to deliver a signal to the control circuit 52. Then, a control device 52*a* in the control circuit 52 becomes operated to calculate the amount of feed of the character group stored in the image recording device 46*a* based on the signal delivered from the character and space counter circuit 46*c* and representing the number of feeds and based on the information such as the character size, its modification in shape, the amount of feed and the like and the amount of feed of the character group thus calculated is delivered to a feed amount memory device 46*d*. In addition, the control device 52*a* delivers a character scanning signal to the display means 47 so as to display the character image thereon which is projected through the lens 48 onto the photosensitive medium 49 and photograph of the character image is taken on the photosensitive medium 49. Then, the control device 52*a* becomes operated to deliver a signal to the feed amount memory device 46*a* and the feed amount stored therein is transmitted to the feed circuit 50, thereby shifting the photosensitive medium 49 by a necessary amount. The above described successive operations are repeated to print all of the characters belonging to one line and then the line is shifted to a new line and the print for the new line is started.

Each of European characters is different in width from each other. Strictly speaking, each of Japanese hiragana and katakana is different in width. In the case of Japanese kana, its width becomes different in dependence with the transverse composition or with the longitudinal composition. Such is also applied to several chinese characters.

In order to effect the character print by feeding the characters whose widths are different from each other in accordance with the character width, the character matrix 43 may be provided with a character width mark and the like for every character. This character width mark is detected when the character is projected onto the camera means 45 so as to give an instruction to the feed circuit 50, thereby feeding the photosensitive medium 49 in response to the character width. Such measure is shown in FIG. 6 as a character width detector 53. In the line length is given, the control circuit 52 can effect a calculation with justification and correct the character width by taking an accumulated width of all of the widths of the characters belonging to one line, line length and space between the characters, if necessary, into consideration.

The above described manually operating photocomposing apparatus according to the invention may be used to effect the above mentioned various kinds of special composition. In the first place, if a given number of characters are solidly composed within a line having a given length, an amount of feed capable of reducing it in response to characters is stored beforehand by the memory device in the control circuit 52. This amount of feed capable of reducing it is integrated every time the character is selected so as to ascertain the number of characters which can be printed on one line. In addition, calculation is effected so as to distribute the remainder of the amount of feed over each of the characters. Then, the character image is reproduced and an instruction is given to the feed circuit 50 such that the photosensitive medium 49 is fed by the calculated amount.

Similarly, in the case of European characters, all of the characters once selected are stored in the memory means 46. The selection of the characters is stopped within a range at which justification is possible. The control circuit 52 is operated to effect calculation in a manner such that the remainder of the line length is distributed over every space between adjacent characters. Then, the character image is produced and the feed of the photosensitive medium 49 is effected. Thus, the European characters can easily be composed with justification without effecting the above described troublesome procedure of double composition. In the case of the prohibition treatment, presence or absence of the prohibition treatment at the beginning of line is discriminated. Thus, several characters at the beginning of next line are selected and if it is required to effect the prohibition treatment, the control circuit 52 is so operated that the character at the end of line is brought into the beginning of line. In addition, in order to make each line length equal to another line length, a calculation is effected such that the amount of feed of the character at the end of line by one character is suitably distributed over the line to increase the space between the adjacent characters. This calculation result is instructed to the feed circuit 50.

Similarly, reset type calculation, flush right and left, flush centered, composition of chemical structural formulas, composition of musical notes and the like may be effected. In these cases, in the first place, required character, mark and the like are selected and then the amount of feed relative to the character and mark is determined and subsequently, the photosensitive medium 49 is fed in accordance with such amount of feed.

As stated hereinbefore, all of the characters belonging to one line are selected and then the print button 51*b* of the instruction button group 51 is pushed to effect the printing. Alternatively, the number of characters belonging to one line or the line length may be instructed beforehand to the control means 52. In this case, the reproduction and feed are automatically effected when the number of characters or the line length is reached. Similarly, the solid composition, European characters prohibition treatment and other various kinds of special compositions may be effected. In addition, the lenses 44, 48 may be changed or the deflecting circuit voltage of the display means 47, for example, cathode ray tube may be suitably be selected so as to magnify or reduce the characters. Similarly, this measure ensures any modification in shape of the characters.

Figure 6:
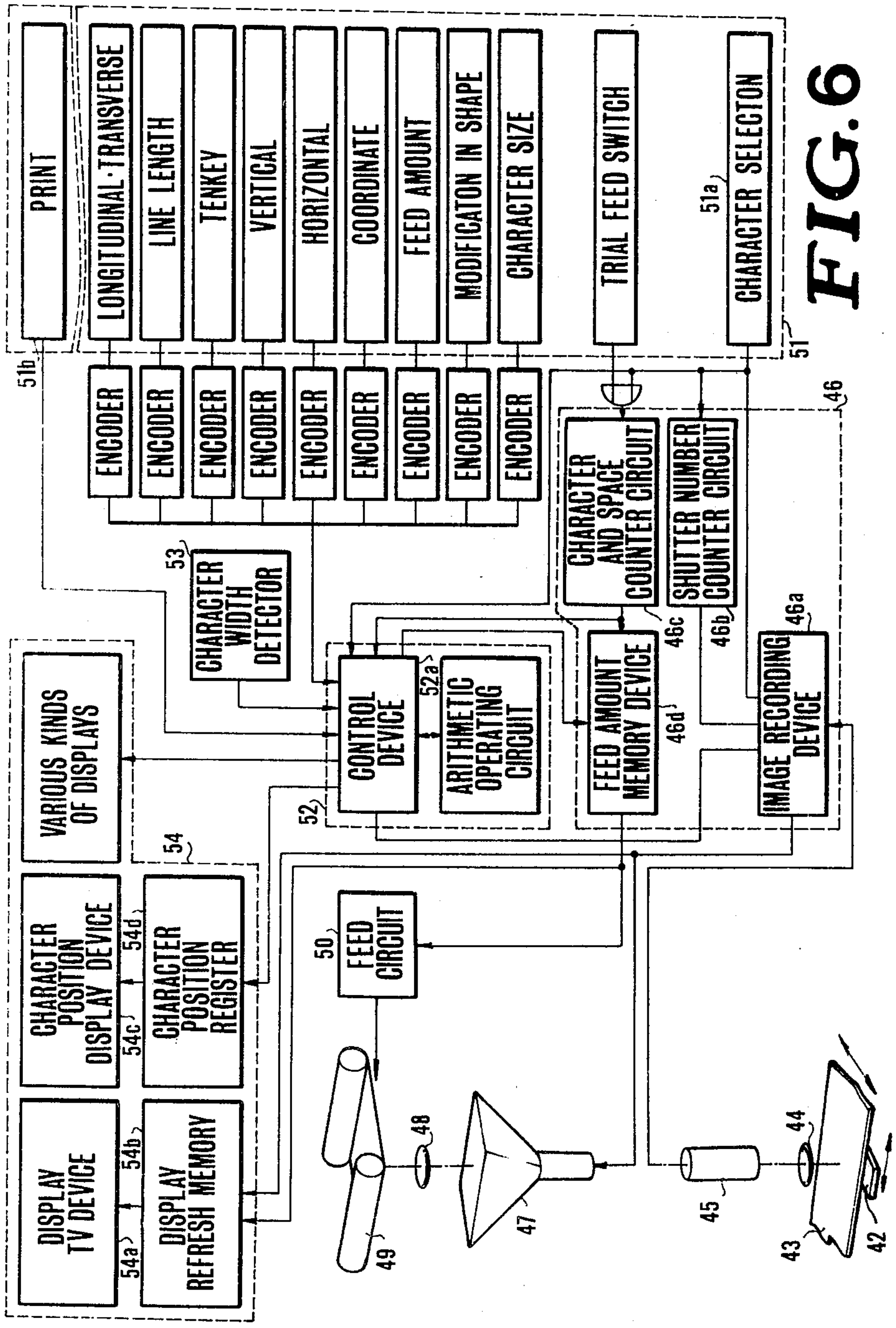
FIG. 6 shows similarly the photocomposing apparatus shown in FIG. 5 in greater detail. The invention will now be described in greater detail with reference to the accompanying drawings.

In FIG. 6, reference numeral 54 designates a monitor display means which is composed of a display television device 54*a*, a display refresh memory 54*b* connected to outputs of the image recording device 46*a* and the feed amount memory device 46*d*, respectively, and delivering a signal to the display television device 54*a*, a character position display device 54*c*, and a character position register 54*d* connected to an output of the control device 52*a* of the control circuit 52 and delivering a signal to the character position display device 54*c*.

The above described monitor display means 54 is capable of displaying the character image which has been stored in the memory means 46 before the character image is printed on the photosensitive medium 49. As a result, the monitor display means 54 serves to display the character image beforehand and hence to correct such image by effecting addition and removal of any desired character.

Figure 2:
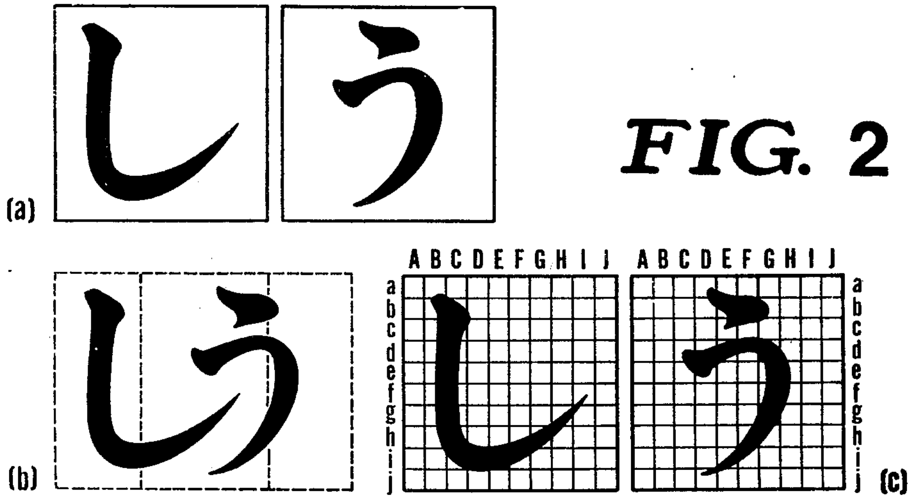
FIG. 2*a* shows customary Japanese characters.
FIG. 2*b* shows similarly the characters shown in FIG. 2*a* and solidly composed.
FIG. 2*c* shows similarly the characters shown in FIG. 2*a* and divided into a number of portions for ease of illustration.
Figure 3:
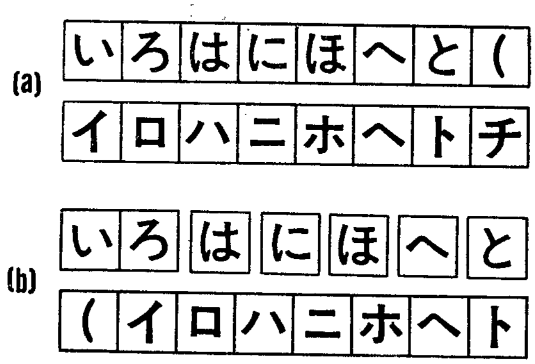
FIG. 3*a* shows Japanese characters having a prohibition mark ( at the end thereof under a condition prior to a prohibition treatment.
FIG. 3*b* shows similarly the Japanese characters under a condition after the prohibition treatment.
Figure 4:
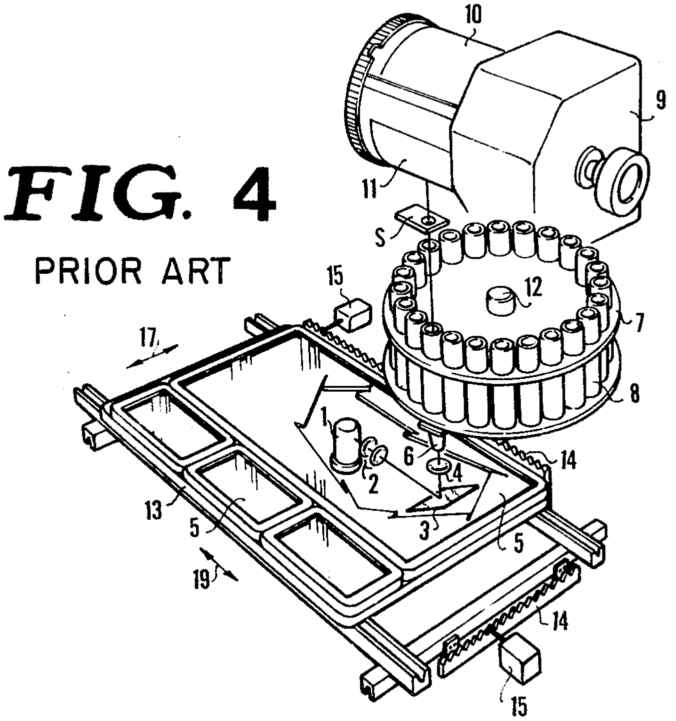
FIG. 4 PRIOR ART
FIG. 4 is a perspective view for schematically showing a conventional photocomposing apparatus.
Figure 5:
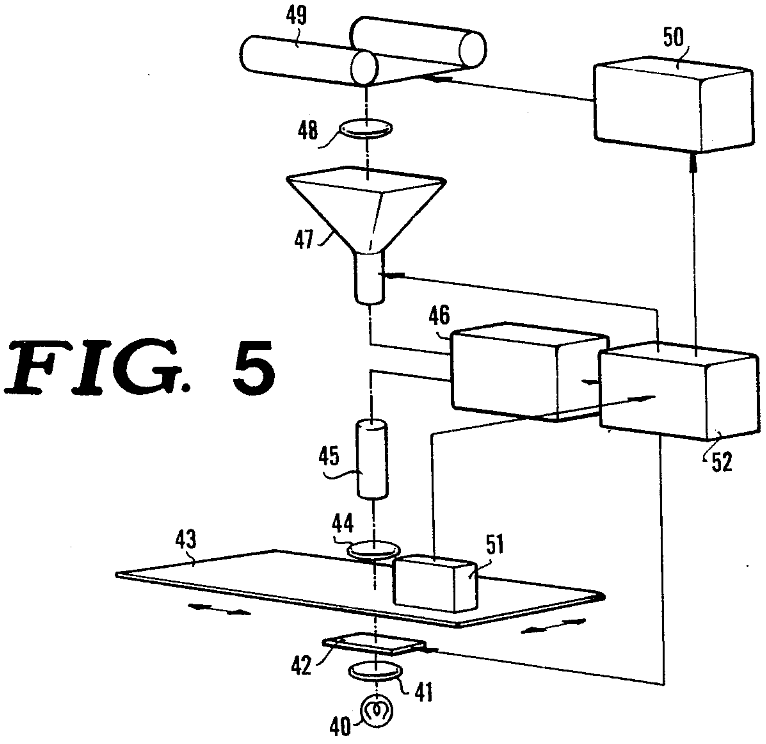
FIG. 5 is a perspective view for schematically showing a photocomposing apparatus according to the invention.

In addition, the monitor display means 54 makes it possible to solidly compose the European characters as shown in FIG. 1*b* and the Japanese characters as shown in FIG. 2*b* while directly observing these characters with the operator's eyes, and as a result, the solid composition can be proceeded while confirming the amount of solid and position of the characters.

As stated hereinbefore, the manually operating photocomposing apparatus according to the invention makes use of a camera means, memory means and display means and which can store characters to be printed and then determine the amount of feed and subsequently print these characters on a photosensitive medium. Thus, the invention has the advantage that various kinds of workings such as increase and decrease of a character space, modification in shape thereof and the like can be effected during a time from selection of characters to real print, that various kinds of special composition such as a solid composition, European composition, prohibition treatment and the like can be effected in a very simple manner, and that burden imposed on an operator can be relieved.

What is claimed is:

1. A manually operated photocomposing apparatus comprising:

a character matrix comprising characters, marks and character width codes, means for selecting the characters and marks, character width detecting means for reading out the character width codes corresponding to the characters and marks selected by the character selecting means, means for photoelectrically converting an image of the selected character or mark, an instruction button group for defining various kinds of information and for applying the information as input signals, a control circuit connected to the character width detecting means and the instruction button group for calculating and determining a feed amount of the character selected by the selecting means in accordance with an information signal from the instruction button group and a character width information signal to determine the feed amount, memory means connected to the photoelectrically converting means and control circuit for memorizing the photoelectrically converted character image in accordance with the order of character selected and for storing the feed amount determined by the control circuit, monitor display means connected to the memory means and control circuit for reading out the content of the memory means and control circuit to reproduce and display the read out content, display means connected to the memory means for reading out and displaying the image and the feed amount memorized in the memory means, print means for printing the image displayed at the display means onto a photosensitive medium.

2. A photocomposing apparatus as claimed in claim 1, wherein said memory means is composed of an image recording device connected to an output terminal of said photoelectric converting means, a shutter number counter circuit connected to said character selecting means and to said image recording device, a character space counter circuit connected to said character selecting means, and a feed amount memory device connected to an output of said character space counter circuit.

3. A photocomposing apparatus as claimed in claim 1, wherein said monitor display means is composed of a display television device, a display refresh memory connected to outputs of said image recording device and said feed amount memory device, respectively, and delivering a signal to said display television device, a character position display device, and a print position register connected to an output of said control device of said control circuit and delivering a signal to said character position display device.

4. A manually operated photocomposing apparatus comprising a character matrix, means for selecting characters, marks and the like contained in said character matrix, means for photoelectrically converting an image of the character selected by said character selecting means, and a print means for forming the image of the character selected on a photosensitive medium, said apparatus comprising a memory means connected to said photoelectrically converting means and storing a photoelectrically converted character image until the feed of said character image is determined, a counter means connected to said memory means and calculating an amount of feed of a group of characters stored in said memory means, and a display means connected to said memory means and reading out, reproducing and displaying the character image whose amount of feed is determined, whereby character images displayed by said display means are printed by said print means in the order displayed, said memory means being composed of an image recording device connected to an output terminal of said photoelectric converting means, a shutter number counter circuit connected to said character selecting means and to said image recording device, a character space counter circuit connected to said character selecting means, and a feed amount memory device connected to an output of said character space counter circuit, a monitor display means which is capable of correcting said character image by effecting addition and removal of any desired character, said monitor display means being composed of a display television device, a display refresh memory connected to outputs of said image recording device and said feed amount memory device, respectively, and delivering a signal to said display television device, a character position display device, and a print position register connected to an output of said control device of said control circuit and delivering a signal to said character position display device.

5. A manually operated photocomposing apparatus comprising a character matrix, means for selecting characters, marks and the like contained in said character matrix, means for photoelectrically converting an image of the character selected by said character selecting means, and a print means for forming the image of the character selected on a photosensitive medium, said apparatus comprising a memory means connected to said photoelectrically converting means and storing a photoelectrically converted character image until the feed of said character image is determined, a counter means connected to said memory means and calculating an amount of feed of a group of characters stored in said memory means, and a display means connected to said memory means and reading out, reproducing and displaying the character image whose amount of feed is determined, whereby character images displayed by said display means are printed by said print means in the order displayed, said memory means being composed of an image recording device connected to an output terminal of said photoelectric converting means, a shutter number counter circuit connected to said character selecting means and to said image recording device, a character space counter circuit connected to said character selecting means, and a feed amount memory device connected to an output of said character space counter circuit.

* * * * *